(12) United States Patent
Cloud

(10) Patent No.: US 8,875,732 B2
(45) Date of Patent: Nov. 4, 2014

(54) FOOD DISPENSING MACHINE AND METHOD

(75) Inventor: Craig Cloud, New Braunfels, TX (US)

(73) Assignee: FBD Partnership, San Antonio, TX (US)

( * ) Notice: Subject to any disclaimer, the term of this patent is extended or adjusted under 35 U.S.C. 154(b) by 0 days.

(21) Appl. No.: 13/211,479

(22) Filed: Aug. 17, 2011

(65) Prior Publication Data

US 2013/0045311 A1    Feb. 21, 2013

(51) Int. Cl.
*F16K 31/12*    (2006.01)
*A23G 9/20*    (2006.01)
*A23G 9/04*    (2006.01)
*A23G 9/28*    (2006.01)
*A23G 9/22*    (2006.01)

(52) U.S. Cl.
CPC  *A23G 9/20* (2013.01); *A23G 9/045* (2013.01); *A23G 9/28* (2013.01); *A23G 9/22* (2013.01)
USPC ........... 137/487.5; 137/605; 62/389; 62/3.64; 222/52

(58) Field of Classification Search
USPC ............ 137/487.5, 12.5, 624.11, 624.15, 137/599.04, 602, 605; 99/323.1; 62/389, 62/64, 161; 426/231; 222/52, 146.6
See application file for complete search history.

(56) References Cited

U.S. PATENT DOCUMENTS

| | | | |
|---|---|---|---|
| 4,201,558 A * | 5/1980 | Schwitters et al. | 62/70 |
| 4,590,970 A * | 5/1986 | Mott | 137/828 |
| 5,706,661 A | 1/1998 | Frank | |
| 6,260,477 B1 * | 7/2001 | Tuyls et al. | 99/323.2 |
| 6,553,779 B1 * | 4/2003 | Boyer et al. | 62/342 |
| 6,625,993 B2 * | 9/2003 | Frank et al. | 62/68 |
| 6,830,239 B1 * | 12/2004 | Weber et al. | 261/121.1 |
| 7,905,373 B2 * | 3/2011 | Beavis et al. | 222/1 |
| 2002/0043071 A1 | 4/2002 | Frank et al. | |
| 2006/0159821 A1 | 7/2006 | Brisson et al. | |
| 2006/0169720 A1 * | 8/2006 | Vipond | 222/146.6 |
| 2007/0017234 A1 | 1/2007 | Moulder et al. | |
| 2008/0023073 A1 * | 1/2008 | Askew | 137/85 |
| 2008/0276641 A1 * | 11/2008 | Wolski et al. | 62/390 |
| 2009/0202701 A1 | 8/2009 | Puaud et al. | |
| 2010/0151083 A1 * | 6/2010 | Klier et al. | 426/66 |
| 2011/0042414 A1 * | 2/2011 | Tachibana et al. | 222/129.1 |

OTHER PUBLICATIONS

Sub, Lw., International Search Report for International Patent Application No. PCT/US2012/050799, dated Dec. 21, 2012, Korean Intellectual Property Office.

Sub, L.W., Written Opinion for International Patent Application No. PCT/US2012/050799, dated Dec. 21, 2012, Korean Intellectual Property Office.

* cited by examiner

*Primary Examiner* — Craig Schneider
*Assistant Examiner* — Jessica Cahill
(74) *Attorney, Agent, or Firm* — Sutton McAughan Deaver, PLLC

(57) ABSTRACT

A food dispensing machine includes a product chamber and an ingredients source including a gas source connected to the product chamber. A flow control device is configured to control ingredients flow from the ingredients source to the product chamber. A pressure measurement device is configured to output a gas pressure signal, and a controller is configured to receive the gas pressure signal and determine a gas flow control signal based on the gas pressure signal. The controller outputs the gas flow control signal to the flow control device.

9 Claims, 2 Drawing Sheets

FOOD DISPENSING MACHINE AND METHOD

BACKGROUND

This disclosure relates generally to food dispensing machines, and more particularly to frozen carbonated beverage machines.

Food dispensing machines, such as frozen carbonated beverage machines produce a frozen beverage by freezing a mixture of water, syrup concentrate and carbon dioxide in a mixing, or freezing, chamber. The freezing chamber is typically surrounded by a coil that contains refrigerant to cause freezing of the mixture inside to a desired level of consistency. The mixture is removed from the inner surface and mixed by a rotating shaft driving a scraping/mixing member attached to the shaft. The frozen mixture consistency is controlled by any of a number of methods that turns on the refrigeration to freeze and turns off the refrigeration when the mixture reaches the desired consistency. A consumer can then dispense the product as desired through a dispensing valve.

The water and syrup concentrate are usually supplied to the freezing chamber via flow controls to maintain a precise flow rate of liquid even as the inlet and/or discharge pressures vary. The carbon dioxide gas flow rate is controlled via a regulator and orifice. The volume of the product dispensed from the mixing chamber is defined as "overrun." A beverage that doubles its volume when it is dispensed from the mixing chamber in a semi-frozen state is defined as having an overrun of 100%. Generally, the more carbon dioxide that is added to the mixing chamber, the higher the overrun. It is desirable to be able to control overrun so that the consistency of the product can be maintained.

The regulator controls the pressure of gas input to the freezing chamber, but the discharge pressure from the regulator can vary and result in fluctuations in the gas flow rate. One method to mitigate this fluctuation is to increase the inlet pressure to the regulator until the normal discharge pressure range from the regulator is low enough as not to affect the flow rate. However, pressure regulators can drift, resulting in variations in the discharge pressure. Further, the carbon dioxide content of the finished product often needs to be adjusted to produce the desired drink consistency.

SUMMARY

A food dispensing machine and method are disclosed. The machine includes a product chamber and an ingredients source including a gas source connected to the product chamber. A flow control device is configured to control ingredients flow from the ingredients source to the product chamber. A pressure measurement device is configured to output a gas pressure signal, and a controller is configured to receive the gas pressure signal and determine a gas flow control signal based on the gas pressure signal. The controller outputs the gas flow control signal to the flow control device.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
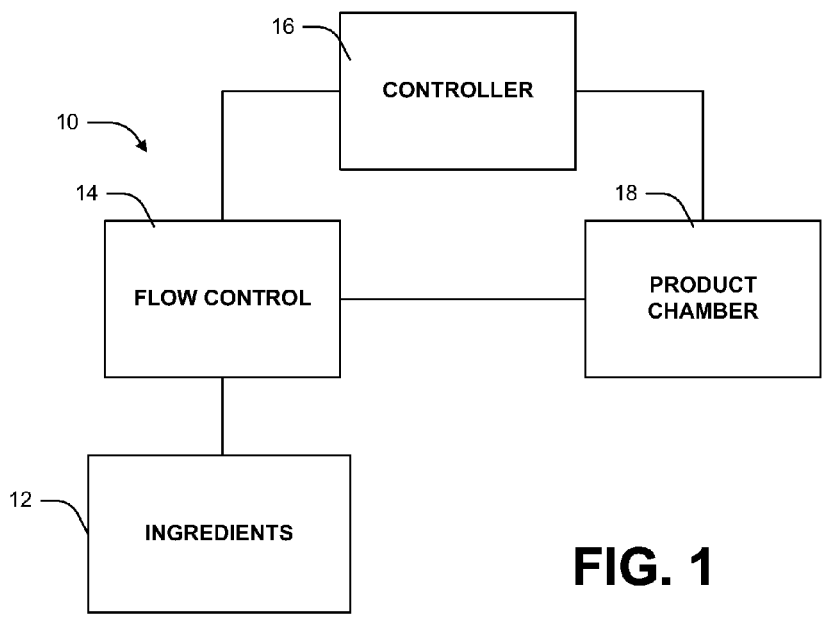
FIG. 1 is a block diagram illustrating aspects of a food dispensing machine in accordance with aspects of the present disclosure.

FIG. 1 is a block diagram illustrating a food dispensing machine system 10 in accordance with the present disclosure. The system 10 includes an ingredient supply 12, a flow control 14, a control circuit or controller 16, and a product chamber 18. In some embodiments, the machine 10 is a frozen carbonated beverage dispensing machine. For producing frozen carbonated beverages, the ingredient supply 12 includes water, syrup and carbon dioxide. The product chamber 18 is a freezing chamber, and typical systems may include two or more freezing chambers 18 and associated syrup supplies allowing a single system to provide multiple beverage flavors.

Water and syrup are flow from their respective sources to the freezing chamber 18 via the flow control 14. The flow control 14 includes, for example, a brix adjuster that controls the amount of syrup that is mixed with the water and a solenoid controls the flow of the syrup/water mixture. The flow controllers for the water and syrup typically are set manually.

Figure 2:
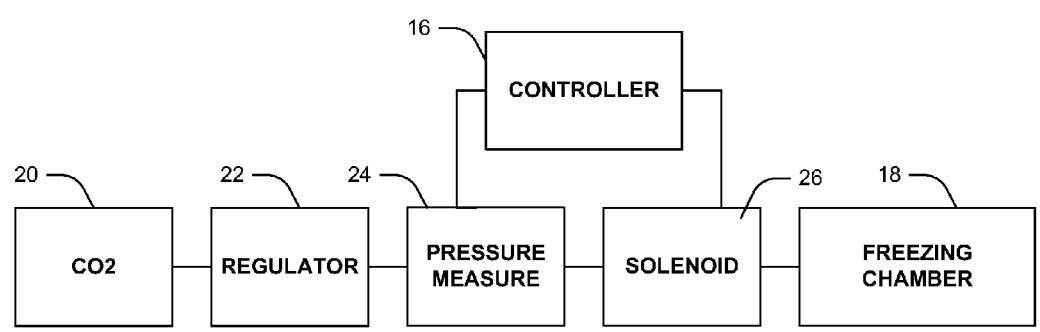
FIG. 2 is a block diagram illustrating a gas flow control system suitable for the machine shown in FIG. 1.

In embodiments where the machine 10 produces frozen beverages, the freezing chamber 18 is cooled by a refrigeration system that may be controlled by the controller 16. The controller 16 can be implemented by an appropriately programmed computer device as would be apparent to one skilled in the art having the benefit of this disclosure. The chamber 18 is surrounded by a coil that contains refrigerant to cause freezing of the mixture inside to a desired level of consistency. The mixture is removed from the inner surface and mixed by a rotating shaft driving a scraping/mixing member attached to the shaft. The frozen mixture consistency is controlled by any of a number of methods that turns on the refrigeration to freeze and turns off the refrigeration when the mixture reaches the desired consistency. The product is then dispensed from the freezing chamber 18 by a dispensing valve FIG. 2 illustrates further aspects of the system 10. Referring now to FIG. 2, carbon dioxide gas ($CO_2$) is supplied from a $CO_2$ supply such as a tank 20 to a pressure regulator 22 configured to adjust the pressure of the carbon dioxide provided to the mixing chamber 18. In other implementations, a gas other than $CO_2$ is provided. For example, air can be injected into the beverage to produce a frozen uncarbonated beverage.

The pressure of the carbon dioxide flowing into the regulator 22 from the tank 20 is approximately 70 psi in some embodiments, with the pressure of the carbon dioxide exiting the regulator 22 and being supplied to the mixing chamber 18 being about 60 psi.

The pressure of the regulated $CO_2$ gas is measured by a pressure measurement device 24 such as a pressure transducer. In one implementation, a model 90CP2-1 0231 (0-100 PSIG) from Sensata Technologies, Inc. is used. The pressure measurement is provided as an input to the controller 16, which provides a control signal to a flow control device such as a solenoid 26 to control the flow of the $CO_2$ gas to the freezing chamber 18 based on the determined gas pressure. A suitable solenoid is provided in one implementation by Kendrion Tri-Tech LLC of Mishawaka, 1N, Part No. 19390001C. Other embodiments are envisioned in which other aspects of the gas are monitored and used as an input to the controller. For example, the measured pressure could be compared to a target pressure and the pressure error could be received by the controller 16 to determine a control signal.

In some embodiments, the gas flow rate is controlled by varying a pulse-width modulation (PWM) signal controlling the solenoid 26. With PWM control of the solenoid 26 the average on time of the solenoid 26, and thus the gas flow rate, is controlled by turning the solenoid on and off (opening and closing) at a fast pace. The longer the solenoid 26 is on compared to the off periods, the longer its average on time. The term duty cycle describes the proportion of "on" time to the regular interval or "period" of time. A lower duty cycle corresponds to shorter on time of the solenoid 26 because the solenoid is off for most of the time period. Duty cycle is expressed in percent, with 100% being fully on.

Figure 3:
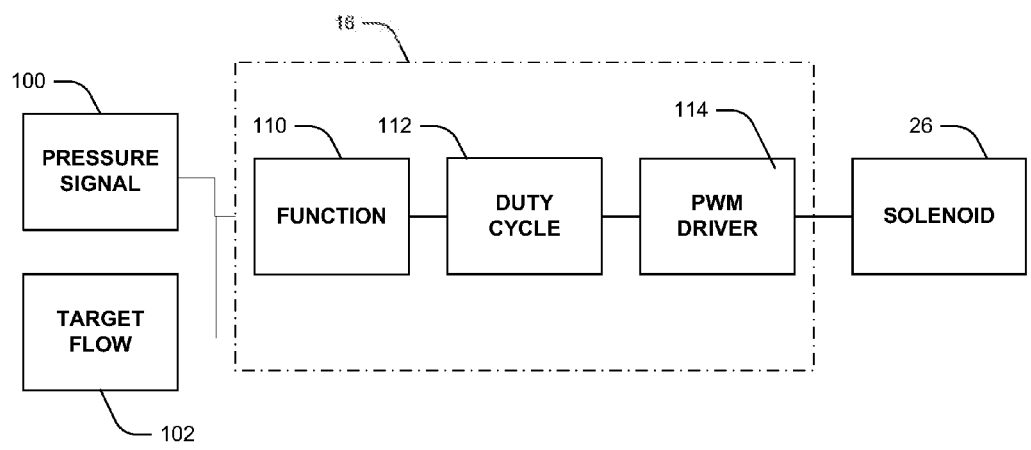
FIG. 3 is a block diagram illustrating further aspects of the gas flow control system shown in FIG. 2.

FIG. 3 illustrates an example of a gas flow control process and system. The controller 16 receives a gas pressure measurement signal 100. In the embodiment illustrated in FIG. 2, the pressure signal 100 is provided by the pressure transducer 24 such that the controller 16 receives an indication of the regulated $CO_2$ pressure. The controller 16 includes a function 110 that calculates a duty cycle 112 based on the pressure measurement signal 100. The calculated duty cycle 112 is provided to a solenoid driver 114 that converts the duty cycle 112 to a control signal that is output to the solenoid 26. Thus, the flow rate of $CO_2$ to the product chamber is dynamic—it can be recalculated and if necessary, changed based on changes in gas pressure. In one embodiment, this is implemented via an empirically derived look up table stored in a memory associated with the controller 16. Table 1 below is an example of a portion of such a look up table, illustrating the duty cycle corresponding with pressures ranging from 60 psi to 75 psi. Of course, the entire look up table would likely have a larger range of gas pressures and corresponding duty cycles.

TABLE 1

| | |
|---|---|
| C02 PSI = 60 | Duty Cycle = 81 |
| C02 PSI = 65 | Duty Cycle = 76 |
| C02 PSI = 70 | Duty Cycle = 72 |
| C02 PSI = 75 | Duty Cycle = 68 |

In the implementation illustrated in FIG. 3, the controller 18 also receives a target flow rate signal 102, which is also used as an input by the function 110 to calculate the duty cycle 112. The desired flow rate 102 could simply represent a desired $CO_2$ flow rate, or it could be expressed in terms of a desired overrun, for example, when implemented in conjunction with a frozen beverage machine. A higher gas flow results in a higher the overrun, so that the beverage produced will be the lighter. The lower the gas flow rate is, the lower the overrun will be, and thus the heavier and more "liquidy" the beverage product will be. With an implementation such as this, the look up table additionally includes a desired flow input. Table 2 below is an example of a portion of such a look up table, adding desired flow ("flow") to the data included in Table 1 above.

TABLE 2

| | | |
|---|---|---|
| C02 PSI = 60 | Flow = 20 | Duty Cycle = 33 |
| C02 PSI = 60 | Flow = 22 | Duty Cycle = 36 |
| C02 PSI = 60 | Flow = 24 | Duty Cycle = 40 |
| C02 PSI = 60 | Flow = 26 | Duty Cycle = 43 |
| C02 PSI = 60 | Flow = 28 | Duty Cycle = 46 |
| C02 PSI = 60 | Flow = 30 | Duty Cycle = 50 |
| C02 PSI = 60 | Flow = 32 | Duty Cycle = 52 |
| C02 PSI = 60 | Flow = 34 | Duty Cycle = 55 |
| C02 PSI = 60 | Flow = 36 | Duty Cycle = 58 |
| C02 PSI = 60 | Flow = 38 | Duty Cycle = 62 |
| C02 PSI = 60 | Flow = 40 | Duty Cycle = 65 |
| C02 PSI = 60 | Flow = 42 | Duty Cycle = 68 |
| C02 PSI = 60 | Flow = 44 | Duty Cycle = 71 |
| C02 PSI = 60 | Flow = 46 | Duty Cycle = 75 |
| C02 PSI = 60 | Flow = 48 | Duty Cycle = 78 |
| C02 PSI = 60 | Flow = 50 | Duty Cycle = 81 |
| C02 PSI = 60 | Flow = 52 | Duty Cycle = 85 |
| C02 PSI = 60 | Flow = 54 | Duty Cycle = 88 |
| C02 PSI = 60 | Flow = 56 | Duty Cycle = 91 |
| C02 PSI = 60 | Flow = 58 | Duty Cycle = 94 |
| C02 PSI = 60 | Flow = 60 | Duty Cycle = 98 |
| C02 PSI = 60 | Flow = 62 | Duty Cycle = 100 |
| C02 PSI = 60 | Flow = 64 | Duty Cycle = 100 |
| C02 PSI = 60 | Flow = 66 | Duty Cycle = 100 |
| C02 PSI = 60 | Flow = 68 | Duty Cycle = 100 |
| C02 PSI = 60 | Flow = 70 | Duty Cycle = 100 |
| C02 PSI = 60 | Flow = 72 | Duty Cycle = 100 |
| C02 PSI = 60 | Flow = 74 | Duty Cycle = 100 |
| C02 PSI = 65 | Flow = 20 | Duty Cycle = 31 |
| C02 PSI = 65 | Flow = 22 | Duty Cycle = 34 |
| C02 PSI = 65 | Flow = 24 | Duty Cycle = 37 |
| C02 PSI = 65 | Flow = 26 | Duty Cycle = 40 |
| C02 PSI = 65 | Flow = 28 | Duty Cycle = 43 |
| C02 PSI = 65 | Flow = 30 | Duty Cycle = 46 |
| C02 PSI = 65 | Flow = 32 | Duty Cycle = 50 |
| C02 PSI = 65 | Flow = 34 | Duty Cycle = 52 |
| C02 PSI = 65 | Flow = 36 | Duty Cycle = 55 |
| C02 PSI = 65 | Flow = 38 | Duty Cycle = 58 |
| C02 PSI = 65 | Flow = 40 | Duty Cycle = 61 |
| C02 PSI = 65 | Flow = 42 | Duty Cycle = 64 |
| C02 PSI = 65 | Flow = 44 | Duty Cycle = 67 |
| C02 PSI = 65 | Flow = 46 | Duty Cycle = 70 |
| C02 PSI = 65 | Flow = 48 | Duty Cycle = 73 |
| C02 PSI = 65 | Flow = 50 | Duty Cycle = 76 |
| C02 PSI = 65 | Flow = 52 | Duty Cycle = 79 |
| C02 PSI = 65 | Flow = 54 | Duty Cycle = 82 |
| C02 PSI = 65 | Flow = 56 | Duty Cycle = 85 |
| C02 PSI = 65 | Flow = 58 | Duty Cycle = 88 |
| C02 PSI = 65 | Flow = 60 | Duty Cycle = 91 |
| C02 PSI = 65 | Flow = 62 | Duty Cycle = 95 |
| C02 PSI = 65 | Flow = 64 | Duty Cycle = 98 |
| C02 PSI = 65 | Flow = 66 | Duty Cycle = 100 |
| C02 PSI = 65 | Flow = 68 | Duty Cycle = 100 |
| C02 PSI = 65 | Flow = 70 | Duty Cycle = 100 |
| C02 PSI = 65 | Flow = 72 | Duty Cycle = 100 |
| C02 PSI = 65 | Flow = 74 | Duty Cycle = 100 |
| C02 PSI = 70 | Flow = 20 | Duty Cycle = 29 |
| C02 PSI = 70 | Flow = 22 | Duty Cycle = 32 |
| C02 PSI = 70 | Flow = 24 | Duty Cycle = 35 |
| C02 PSI = 70 | Flow = 26 | Duty Cycle = 38 |
| C02 PSI = 70 | Flow = 28 | Duty Cycle = 41 |
| C02 PSI = 70 | Flow = 30 | Duty Cycle = 44 |

TABLE 2-continued

| | | |
|---|---|---|
| C02 PSI = 70 | Flow = 32 | Duty Cycle = 47 |
| C02 PSI = 70 | Flow = 34 | Duty Cycle = 50 |
| C02 PSI = 70 | Flow = 36 | Duty Cycle = 51 |
| C02 PSI = 70 | Flow = 38 | Duty Cycle = 54 |
| C02 PSI = 70 | Flow = 40 | Duty Cycle = 57 |
| C02 PSI = 70 | Flow = 42 | Duty Cycle = 60 |
| C02 PSI = 70 | Flow = 44 | Duty Cycle = 63 |
| C02 PSI = 70 | Flow = 46 | Duty Cycle = 66 |
| C02 PSI = 70 | Flow = 48 | Duty Cycle = 69 |
| C02 PSI = 70 | Flow = 50 | Duty Cycle = 72 |
| C02 PSI = 70 | Flow = 52 | Duty Cycle = 75 |
| C02 PSI = 70 | Flow = 54 | Duty Cycle = 77 |
| C02 PSI = 70 | Flow = 56 | Duty Cycle = 80 |
| C02 PSI = 70 | Flow = 58 | Duty Cycle = 83 |
| C02 PSI = 70 | Flow = 60 | Duty Cycle = 86 |
| C02 PSI = 70 | Flow = 62 | Duty Cycle = 89 |
| C02 PSI = 70 | Flow = 64 | Duty Cycle = 92 |
| C02 PSI = 70 | Flow = 66 | Duty Cycle = 95 |
| C02 PSI = 70 | Flow = 68 | Duty Cycle = 98 |
| C02 PSI = 70 | Flow = 70 | Duty Cycle = 100 |
| C02 PSI = 70 | Flow = 72 | Duty Cycle = 100 |
| C02 PSI = 70 | Flow = 74 | Duty Cycle = 100 |
| C02 PSI = 75 | Flow = 20 | Duty Cycle = 28 |
| C02 PSI = 75 | Flow = 22 | Duty Cycle = 30 |
| C02 PSI = 75 | Flow = 24 | Duty Cycle = 33 |
| C02 PSI = 75 | Flow = 26 | Duty Cycle = 36 |
| C02 PSI = 75 | Flow = 28 | Duty Cycle = 39 |
| C02 PSI = 75 | Flow = 30 | Duty Cycle = 41 |
| C02 PSI = 75 | Flow = 32 | Duty Cycle = 44 |
| C02 PSI = 75 | Flow = 34 | Duty Cycle = 47 |
| C02 PSI = 75 | Flow = 36 | Duty Cycle = 50 |
| C02 PSI = 75 | Flow = 38 | Duty Cycle = 51 |
| C02 PSI = 75 | Flow = 40 | Duty Cycle = 54 |
| C02 PSI = 75 | Flow = 42 | Duty Cycle = 57 |
| C02 PSI = 75 | Flow = 44 | Duty Cycle = 59 |
| C02 PSI = 75 | Flow = 46 | Duty Cycle = 62 |
| C02 PSI = 75 | Flow = 48 | Duty Cycle = 65 |
| C02 PSI = 75 | Flow = 50 | Duty Cycle = 68 |
| C02 PSI = 75 | Flow = 52 | Duty Cycle = 70 |
| C02 PSI = 75 | Flow = 54 | Duty Cycle = 73 |
| C02 PSI = 75 | Flow = 56 | Duty Cycle = 76 |
| C02 PSI = 75 | Flow = 58 | Duty Cycle = 79 |
| C02 PSI = 75 | Flow = 60 | Duty Cycle = 81 |
| C02 PSI = 75 | Flow = 62 | Duty Cycle = 84 |
| C02 PSI = 75 | Flow = 64 | Duty Cycle = 87 |
| C02 PSI = 75 | Flow = 66 | Duty Cycle = 89 |
| C02 PSI = 75 | Flow = 68 | Duty Cycle = 92 |
| C02 PSI = 75 | Flow = 70 | Duty Cycle = 95 |
| C02 PSI = 75 | Flow = 72 | Duty Cycle = 98 |
| C02 PSI = 75 | Flow = 74 | Duty Cycle = 100 |

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A food dispensing machine, comprising:
   a product chamber;
   an ingredients source including a gas source connected to the product chamber;
   a flow control device configured to control ingredients flow from the ingredients source to the product chamber;
   a pressure measurement device configured to output a gas pressure signal; and
   a controller configured to receive the gas pressure signal and determine a gas flow control signal based on the gas pressure signal, and output the gas flow control signal to the flow control device;
   wherein the controller is configured to receive a desired gas flow rate, and wherein the gas flow control signal is based on the desired gas flow rate;
   further wherein the gas flow rate is adapted to be calculated and changed based on changes in gas pressure.

2. The machine of claim 1, wherein the flow control device includes a solenoid connected between the gas source and the product chamber.

3. The machine of claim 1, wherein the gas flow control signal include a pwm signal, and wherein the controller is configured to vary a pwm duty cycle based on the gas pressure signal.

4. The machine of claim 1, wherein the controller is configured to vary a pwm duty cycle based on the determined pressure and the desired gas flow rate.

5. The method of claim 1, wherein the controller is configured to:
   receive a desired gas pressure signal;
   calculate an error between the desired gas pressure signal and the gas pressure signal received from the pressure measurement device; and
   determine the gas flow control signal based on the error.

6. The machine of claim 1, wherein the gas is carbon dioxide gas.

7. The machine of claim 1, further comprising a pressure regulator receiving gas from the gas source.

8. The machine of claim 1, wherein the product chamber is a freezing chamber configured to freeze the ingredients to produce a frozen beverage.

9. The machine of claim 1, wherein the controller determines the gas flow control signal when the gas pressure signal changes.

* * * * *